Jan. 10, 1967 S. L. KACZEUS 3,296,857
APPARATUS FOR MEASURING THE TENSION OF FLEXIBLE MATERIALS
Filed Aug. 19, 1964 2 Sheets-Sheet 1
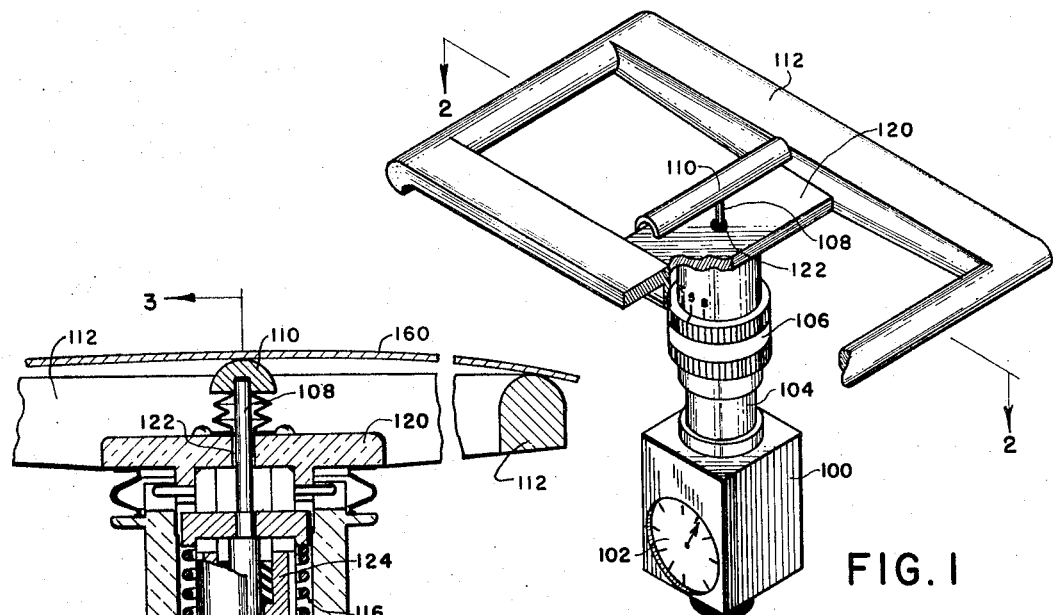
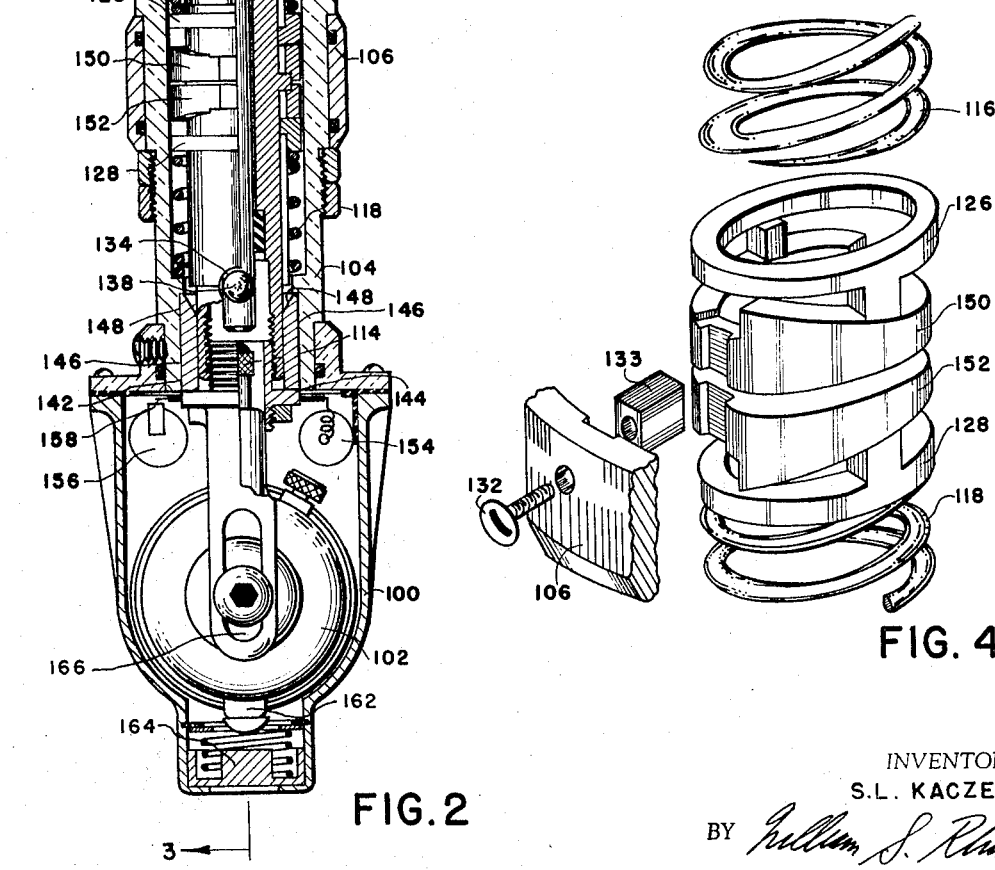
INVENTOR.
S.L. KACZEUS
BY *William S. Rhnis*
ATTORNEY

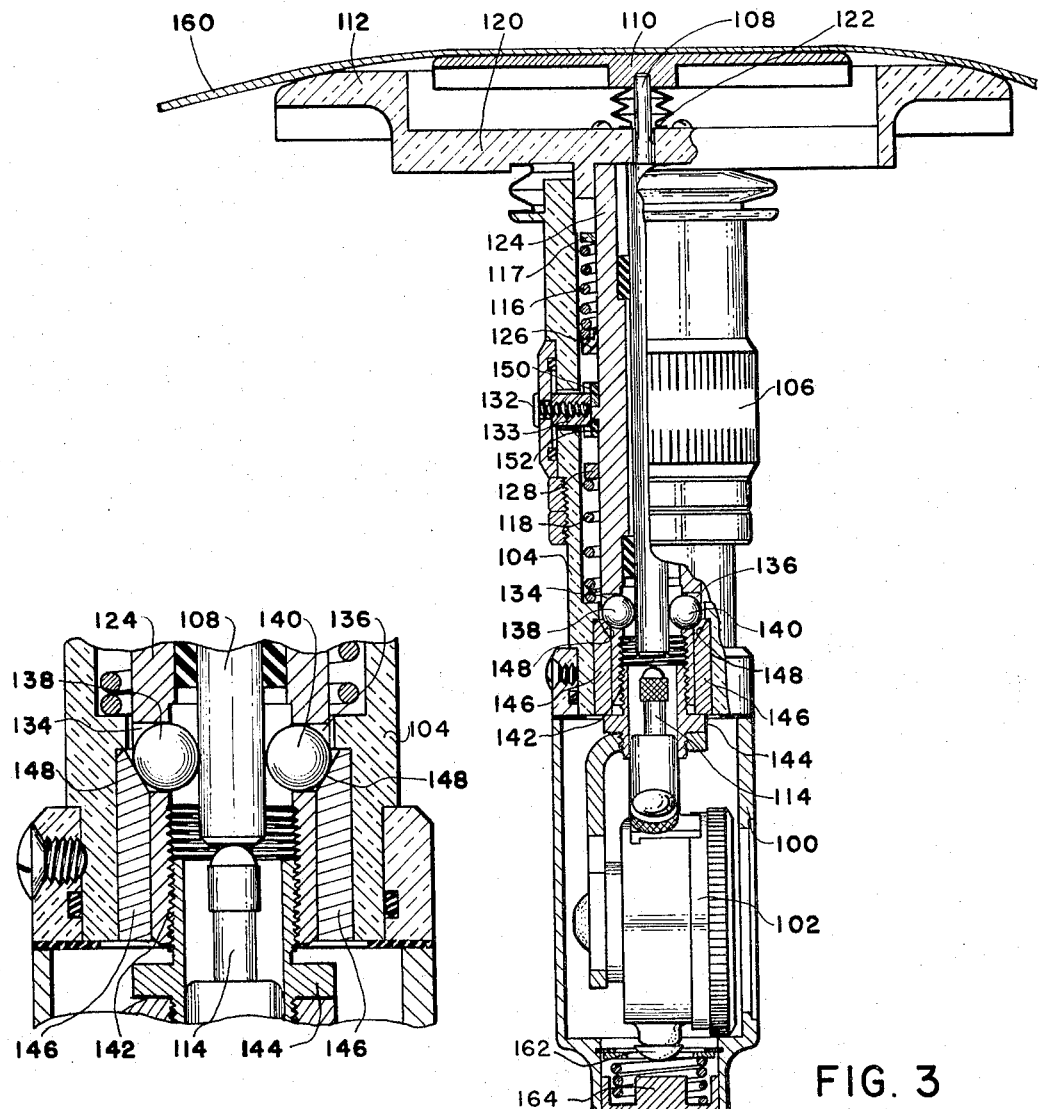

United States Patent Office 3,296,857
Patented Jan. 10, 1967

3,296,857
APPARATUS FOR MEASURING THE TENSION
OF FLEXIBLE MATERIALS
Steve L. Kaczeus, Milford, Conn., assignor to Huyck
Corporation, Rensselaer, N.Y., a corporation of New
York
Filed Aug. 19, 1964, Ser. No. 390,644
9 Claims. (Cl. 73—159)

This invention relates to the measurement of tension in flexible materials.

In many applications, objects made from flexible material are used while under tension, where the amount of tension placed on them is critical. A minimum tension may be sought, as for example in leather belting or automobile fan belts, where the requisite amount of friction between the belt and its associated drive pulleys is a function of the tension placed on the belt. It may be desired to establish tension below a designated maximum, as for example in certain paper tape wrapping machinery. Or it may be desired to establish tension at some value within a certain range that has been established as the optimum for a given set of circumstances. Examples of materials in this category are the endless cloths used in several places in paper manufacturing machinery, where insufficient tension might permit a cloth to wrinkle, as might over-tensioning the cloth beyond its inherent yield point; in either of which cases derogatory affects occur on the surface of paper which the cloth in question is transporting through the papermaking machinery.

Among the many devices used in measuring the tension on flexible materials positioned in an extended attitude, one type utilizes the concept of measuring the resistance of the material to deflection from its normal position and correlating the magnitude of such resistance with the amount of tension on the material. Devices of this type are widely recognized as offering attractive advantages, such as simplicity of design with consequent low cost to manufacture and maintain. Such devices can be made to measure accurately tension on various materials, but with none of them is it possible to preclude the possibility that there may be errors in the values recorded attributable to increases in tension resulting from thrusting the testing device itself against the material.

Because of this limitation, great care had to be taken in the past to be sure that the positional relationship between the measuring device and the normal location of the material to be tested was rigidly maintained, otherwise unidentifiable reading errors could occur. This greatly restricted the use of such devices, for example, making it undesirable to utilize the displacement concept in a portable measuring device, or for measuring the tension on the material in question from other than one position or angle.

It is an object of this invention to provide a means whereby the tension on a flexible material in an extended attitude may be measured.

It is another object of this invention to provide a means whereby measurements of tension on a flexible material may be made with accuracy.

Still another object of this invention is to provide a portable means of measuring tension on a flexible material positioned in an extended attitude.

Yet another object of this invention is to provide a means whereby tension measurements may be made on flexible material from a variety of angles.

Another object of this invention is to provide a means whereby tension measurements may be made on flexible material at any of a number of different locations.

This invention achieves these and other objects which will be readily apparent to those skilled in the art by restricting actuation of the measuring device resulting from the tendency of the material tested to resist deflection from its normal attitude to that amount only which is proportional to the actual tension on the material being tested.

This invention may be clearly understood by reference to the attached drawings in which:

FIGURE 1 is a perspective view of one embodiment of this invention,

FIGURE 2 is a cross-sectional view through the plane 2—2 in FIGURE 1,

FIGURE 3 is a cross-sectional view through the plane 3—3 shown in FIGURE 2,

FIGURE 4 is an exploded isometric view of the angle adjustment mechanism shown in FIGURES 2 and 3, And FIGURE 5 is an enlarged view of the locking mechanism shown in FIGURE 3.

The embodiment of this invention which is illustrated in FIGURE 1 is one which is particularly suited for measuring the tension on sheet-like flexible material. Its elements include a handle 100 in which is positioned a dial indicator 102, a shaft housing 104 on which is positioned an angle adjustment ring 106 and through which passes a sensing rod 108 interconnecting a sensing element 110 with the dial indicator 102, and a locking frame 112.

Referring now to FIGURE 2, it will be seen that movement of the sensing rod 108 downward will cause it to impinge upon the actuating probe 114 of the dial indicator 102. The locking frame 112 has a cross member 120 with a center hole 122 through which the sensing rod 108 freely passes. The cross member 120 is affixed to a cylindrical locking shaft 124 which is positioned about the sensing rod 108 and inside the springs 116, 118.

Referring now to FIGURE 3, it will be seen that toward the lower end of the locking shaft 124 are apertures 134, 136 in which are positioned balls 138, 140 which are in contact with the sensing rod 108. The extreme lower end of the locking shaft 124 has an inside threaded section 142 which is engaged with the threaded portion of a fixture 144 supporting the dial indicator 102. The lower threaded portion of the locking shaft 124 is positioned within and in sliding engagement with an insert 146 having an inwardly beveled upper portion 148, which insert is in turn positioned within the shaft housing 104 at its lower end. The locking shaft apertures 134, 136 and the balls 138, 140 positioned therein are normally located slightly above the beveled portion 148 of the insert 146.

The angle adjustment ring 106 is affixed, by means of a set screw 132 and a key 133, to rings 150, 152; the ring 150 having helical surfaces facing upward which slidably engage the lower surface of teeth on an upper spring compression ring 126, and the ring 152 having helical surfaces facing downward which slidably engage the upper surface of teeth on a lower spring compression ring 128. FIGURE 4 illustrates these component parts of the angle adjustment mechanism in an exploded view.

As may be seen by viewing FIGURES 2, 3 and 4 together, rotation of the angle adjustment ring 106 causes the helically surfaced rings 150, 152 to rotate and, through the action of the beveled surfaces bearing on the teeth on the spring compression rings 126, 128, to compress the springs 116, 118 or permit them to expand, depending on the direction in which the angle adjustment ring 106 is rotated. By this means, for example, spring 116 may, by rotating the angle adjustment ring 106 from left to right, be placed under increased compression which, through action of the spring 116 bearing on the cross bar 117 affixed to the sensing rod 108, makes it necessary to increase the amount of pressure on the sensing element 110 to propel the sensing rod 108 downward in order to actuate the actuating probe 114 of the dial indicator 102.

Simultaneously, such rotation of the angle adjustment ring 106 will cause the spring 118 to compress, making it necessary to increase the amount of pressure on the locking frame 112 necessary to propel the locking shaft 124 downward in order to actuate the locking mechanism as hereinafter described.

This adjustment mechanism makes it possible to get accurate tension measurements on a horizontal sheet by thrusting the device upward from the underside of the sheet, since the weight of the locking frame 112 and locking shaft 124, and the sensing element 110 and sensing rod 108 may be compensated for. On the other hand, it is possible to make a tension measurement from the top of the sheet using the same device since the angle adjustment ring 106 may be rotated from right to left, thereby relaxing the springs 116, 118, so that less pressure on the sensing element 110 and locking frame 112 is required to actuate the dial indicator and the locking mechanism, thereby compensating for the subtractive effect of the weight of the sensing element 110 and the sensing rod 108, and the locking frame 112 and the locking shaft 124, when the device is upside down.

Referring again to FIGURE 2, it will be seen that a lamp circuit is positioned near the top of the dial indicator 102 comprising a battery 154 connected to a lamp 156 through a switch 158 which is so affixed to the lower end of the locking shaft 124 that it is normally open, but closes when the shaft 124 is displaced downward to the greatest extent possible.

The operation of the embodiment of this invention which has heretofore been set forth will now be described, referring first to FIGURES 2 and 3. A sheet 160 of cloth, paper, plastic film or the like, the tension on which is to be measured, is assumed, for purposes of this illustration, to be in a substantially horizontal attitude. The tension device, positioned at any point in the unsupported span of the sheet 160, is thrust upward so that the sheet bears on the entire locking frame 112, as well as the sensing element 110. The pressure of the sheet 160 on the sensing element 110 causes the sensing rod 108 to move downward. The sensing rod 108 upon engaging the actuating probe 114, causes the dial indicator 102 to display values which increase as the device is thrust further into the sheet 160. Simultaneously, the sheet 160, bearing with increased pressure on the locking frame 112, causes the locking shaft 124 to move downward. As will be noted by viewing FIGURE 5 along with FIGURE 3, as the locking shaft 124 moves downward, the shaft apertures 134, 136 also move downward causing the balls 138, 140 to contact the beveled portion 148 of the insert 146. As the locking shaft 124 continues its downward migration, the beveled portion 148 of the insert 146 effects increasing lateral pressure on the balls 138, 140 causing them to move inward toward the sensing shaft 108 until the pressure of the balls 138, 140 completely stops the sensing shaft 108 from moving any further downward.

By this time, the locking shaft 124 having moved downward to the maximum possible extent, it will be seen in FIGURE 2 that the switch 158 will have closed, causing the battery 154 to energize the lamp 156, thereby informing the operator that the desired reading on the dial indicator 102 has been achieved.

It should be noted that ordinarily it is desired to measure the tension on the material being tested in one direction only, for example, in the "machine direction" on a paper making machine. However, other influences, such as "cross-machine" tensions, may be present which might act on the sensing element 110 and cause it to be depressed more than it would be by the machine direction tension alone at the instant that the sensing rod 108 is braked by actuation of the locking mechanism. As is shown in FIGURES 1 and 3, the effect of such influence can be eliminated in the case of sheet-like materials by making the locking frame with side members having sheet contacting surfaces which are flush with the contact surfaces of the end members of the locking frame. So positioned, the side members support the sheet and negate the influence on the sensing element 110 of tensional forces acting from directions other than that in which the tension is desired to be measured.

By using a dial indicator device of the design in which the indicator needle stays at the position of maximum reading, readings so obtained may be preserved for recording. Such a device may be reset through use of a mechanism such as that shown in FIGURES 2 and 3 wherein the dial indicator 102 is rigidly held in a slot 166 of the fixture 144 in such a fashion that the reset button 162 of the dial indicator 102 will be impinged upon by the spring loaded button 164 when the button is pressed.

It will be apparent from the above statement of the operation of the embodiment which has herein been described that by utilizing this inventive concept, accurate measurements of tension on flexible material may be made. It will be noted that the higher the tension on the flexible material the flatter it will be, and the greater will be the deflection of the pressure sensing element before the locking frame impinges upon the material being tested with sufficient force to actuate the locking mechanism. Therefore, by appropriately adjusting the resistance of the locking frame to forces imposed on it by the material on which it is impinging, displacement of the sensing element so as to produce values on the read-out gauge corresponding exactly to the amount of tension on the flexible material may be effectively achieved.

The embodiment which has been described herein is but one of several which will utilize this invention and is set forth here by way of illustration, but not of limitation. For example, rollers may be used for the elements of the test device which contact the material being tested, thereby making it possible to test continuously running sheets or belts of material. Similarly, the output of the locking frame might be used merely to cut off operation of the dial indicator without actually restricting continued response of the sensing element to increased pressures. It is apparent that these and many other embodiments which will be readily apparent to those skilled in the art may be made without departing materially from the spirit and scope of this invention.

What is claimed is:

1. A tension measuring device comprising first and second pressure sensors, each of which is capable of sensing the amount of pressure to which it is exposed, and an arresting means, said first pressure sensor being so positioned in relation to said second pressure sensor that both impinge simultaneously on the material to be tested, said second sensor causing said arresting means to be actuated when the pressure to which said second pressure sensor is exposed increases to a pre-established amount, said arresting means upon being actuated causing said first pressure sensor to continue to respond only as it did when sensing the amount of pressure to which it was exposed when said second sensor caused said arresting means to be actuated.

2. The device described in claim 1 wherein the pressure at which said second pressure sensor causes said arresting means to be actuated may be varied.

3. The device described in claim 2 wherein said first pressure sensor includes a recording device and said arresting device when actuated causes said recording device to stop recording increases in the pressure to which said first pressure sensor is exposed.

4. The device described in claim 3 wherein a signal means is actuated when said actuator means has caused said recording device to stop recording increases in pressure.

5. A tension measuring device comprising a first pressure actuated member connected to a pressure gauge by means of an actuating rod,
   a friction device bearing on said actuating rod,
   a second pressure actuated member so interconnected with said friction device as to cause the friction produced by said friction device on said actuating rod to increase as pressure on said second pressure actuated member is increased, and means for indicating when the friction on said actuating rod has increased to the point where said actuating rod will not move in response to increased pressure on said first pressure actuated member.

6. A tension measuring device comprising a first pressure actuated member connected to a pressure gauge by means of an actuating rod, a friction device bearing on said actuating rod, a second pressure actuated member so interconnected with said friction device as to cause the friction produced by said friction device on said actuating rod to increase as pressure on said second pressure actuated member is increased, means for indicating when the friction on said actuating rod has increased to the point where said actuating rod will not move in response to increased pressure on said first pressure actuated member, and means for selectively varying the amount of pressure necessary on said second pressure actuated member to cause the friction produced by said friction device to be sufficient to prevent response of said actuating rod to increases in pressure on said first pressure actuated member.

7. A tension measuring device comprising a first pressure sensitive sensor interconnected with a pressure display apparatus, a second pressure sensitive sensor interconnected with an actuator device, said first pressure sensitive sensor and said second pressure sensitive sensor being juxtaposed so that they simultaneously impinge upon the material being tested, said actuating device being positioned so that it causes said display apparatus to stop recording increases in pressure on said first pressure sensitive sensor when the pressure on said second sensitive sensor reaches a predetermined magnitude.

8. A tension measuring device comprising:

a semi-cylindrical pressure sensing element, a pressure recording device, a connecting rod movably affixed to said pressure sensing element and said pressure recording device, a rectangular frame positioned around said connecting rod between said sensing element and said recording device on a plane which is at right angles to said connecting rod and parallel with the axis of said sensing element, a cylindrical locking shaft positioned coaxially with and about said connecting rod, said locking shaft having round apertures at the end thereof nearest said recording device in which are positioned metal balls normally in touching contact with said connecting rod and slightly smaller in diameter than the diameter of said apertures, a cylindrical insert positioned below said apertures in said locking shaft and around said connecting rod coaxially with said locking shaft and said connecting rod and having an inwardly beveled surface facing said balls positioned in said apertures in said locking shaft and so spaced from said balls that the balls do not contact said beveled surface when said locking shaft is in the normal position but do contact said beveled surface when said locking shaft is moved toward said recording device, counterdirectionally acting springs coaxial with, surrounding, and interconnected with said locking shaft exercising comparative extension forces such that said locking shaft is normally held in a position such that said balls are not in contact with said beveled surface of said insert, means for increasing or decreasing the extension forces exercised by said springs, and a lamp circuit comprising at least an electrical energy source, an electrical lamp, means electrically interconnecting the elements of the lamp circuit, and a normally open switch so positioned and designed that said switch is closed and said lamp thereby caused to light when said locking shaft is moved toward said recording device to the greatest extent permitted by said balls bearing on said beveled surface of said insert and on said connecting rod.

9. The device described in claim 8 wherein each of the four members comprising said rectangular frame has one surface in contact with the material to be tested when said device is in use, all of the said surfaces being coplanar.

References Cited by the Examiner

UNITED STATES PATENTS 1,802,685  4/1931  Trier _____ 73—81

FOREIGN PATENTS 115,338  5/1918  Great Britain.
280,292  11/1927  Great Britain.
298,662  10/1928  Great Britain.
150,671  1962  U.S.S.R.

RICHARD C. QUEISSER, *Primary Examiner.*

C. A. RUEHL, *Assistant Examiner.*